Figure 1:
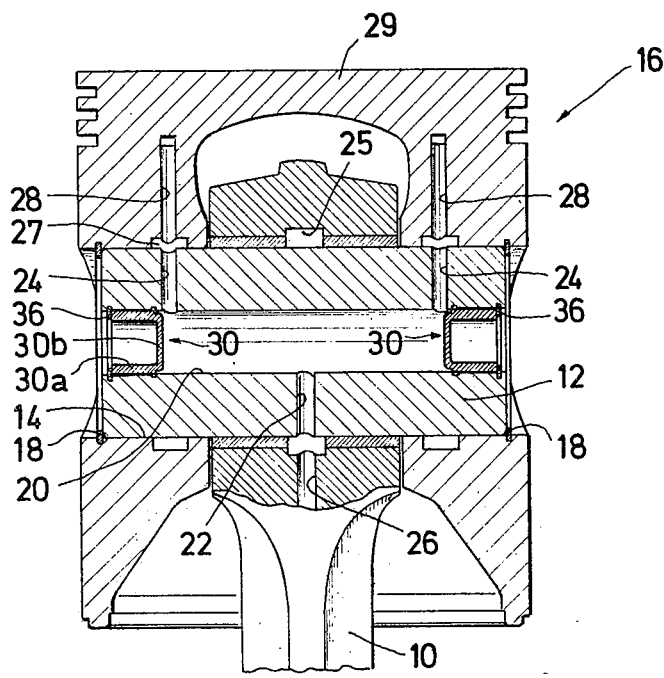

United States Patent [19]

Wizemann et al.

[11] 4,005,686
[45] Feb. 1, 1977

[54] PISTON-PIN FOR LIQUID COOLED PISTONS

[75] Inventors: Kurt Wizemann, Stuttgart; Manfred Pfiz, Nellingen, both of Germany

[73] Assignee: J. Wizemann & Co., Quellenstr. 7, Germany

[22] Filed: June 26, 1975

[21] Appl. No.: 590,421

[52] U.S. Cl. .............................. 123/41.38; 92/190; 123/41.35; 123/41.39

[51] Int. Cl.² .......................................... F01P 1/04

[58] Field of Search ......... 123/41.38, 41.34, 41.35, 123/41.37, 41.39; 92/188, 189, 190

[56] References Cited

UNITED STATES PATENTS

| | | | |
|---|---|---|---|
| 1,387,538 | 8/1921 | Gulick | 92/190 |
| 1,910,902 | 5/1933 | McKone | 123/41.38 |
| 2,369,907 | 2/1945 | Moore | 123/41.38 |
| 2,621,638 | 12/1952 | Chatterton | 123/41.38 |
| 3,204,617 | 9/1965 | Hulbert | 123/41.38 |
| 3,448,664 | 6/1969 | Hulsing | 92/190 |
| 3,555,972 | 1/1971 | Hulsing | 92/190 |

FOREIGN PATENTS OR APPLICATIONS 217,785  10/1961  Austria ........................ 123/41.38

Primary Examiner—Wendell E. Burns
Assistant Examiner—Daniel J. O'Connor
Attorney, Agent, or Firm—Olsen and Stephenson

[57] ABSTRACT

Piston-pin for liquid cooled pistons containing a longitudinal bore and end sealing elements closing said bore, said sealing elements being impressed or shrunk into position. More specifically, the sealing elements are cup shaped, having a rim and a base, the wall-thickness relationship between such rim and base being 1 to 0.6, and the rim wall thickness being substantially less than the wall thickness of the piston pin surrounding the longitudinal bore.

6 Claims, 2 Drawing Figures

PISTON-PIN FOR LIQUID COOLED PISTONS

BACKGROUND OF THE INVENTION

The invention concerns a piston-pin for liquid cooled pistons having at least one longitudinal bore sealed at its ends by cup shaped sealing elements consisting of a base and a rim, and which are impressed or shrunk into position.

In thermically highly strained internal combustion engines, the pistons are often liquid cooled, specifically with the help of lubricating oils. Such oil flows from a bore in the crankshaft through the connecting rod and passages in the piston-pin to the piston, where it picks up heat in the hollow space of the piston base. From there the oil flows back to the crankcase housing.

Various kinds of piston-pins for liquid cooled pistons are known, among them a piston-pin with a central and several eccentric longitudinal bores, where only the latter are used as access means for the coolant. These eccentric longitudinal bores are sealed at their ends by threaded plugs. Therein two disadvantages cannot be avoided; firstly, the eccentric longitudinal bores weaken the piston pin considerably so that piston-pin failures are not rare, and moreover, the oval deformation of the piston-pin upon ignition while the piston is in the upper position causes the threaded plugs in the longitudinal bores to work free as these massive plugs cannot adjust to the oval deformation of the piston pin containing the longitudinal bore.

A second well known type of construction provides for a relatively thin walled pipe inside a central longitudinal bore of the piston-pin, such pipe having at each end a flange element sealing the longitudinal bore. Such embodiments have the disadvantage not only of being relatively expensive, but also of experiencing frequent transverse breaks of the pipe positioned inside the piston bore as a result of the load variations during operation. Yet further complex is a third known piston-pin (DT-PS 1,301,677) containing a central longitudinal bore which, however, does not serve as a passage for cooling oil; for such latter purposes a longitudinal bore is provided in an eccentric separate threaded pin, which is located within the area of the piston pin, and which extends further into the rod and to two bushings surrounding the piston pin. The longitudinal bore in this threaded pin is sealed at its ends by massive plugs which, as mentioned above, are subject to the danger of working free.

Further, a piston pin containing a sealed central longitudinal bore serving as passage for the cooling oil has become known (GB-PS 1,058,360), in which impressed, slightly warped, flat discs are provided apparently as sealing elements for the piston-pin longitudinal bore. While the thickness of these discs is only approximately 25% of the wall thickness of the piston-pin, it is still, despite its warping, much too stiff in the radial direction to adjust to an adequate degree to the overall deformation of the piston-pin upon ignition while in the upper dead center position. The degree of the radial stiffness must be considered in relation to the high pressure per unit of area between the rim of the discs and the wall of the piston-pin longitudinal bore, such high pressure being inevitable as the results of the disc configuration of such sealing elements. It follows that such sealing elements work free after very brief periods of time, and in fact become ineffective as sealing elements after even shorter periods. This would seem to be the reason why such disc shaped sealing elements have never been used for piston-pins, but only as seals to plug cored holes in crankcase housings of internal combustion engines.

Lastly, a piston-pin for non-liquid cooled pistons is known (DT-PS 689 837) containing a central longitudinal bore the ends of which contain mushroom shaped elements with discs turned toward the outside. These mushroom shaped elements do not, however, seal the piston-pin longitudinal bore as there is an opening in the disc; furthermore, it is not important to secure these mushroom shaped elements within the piston pin, as they must only maintain the piston pin in its proper position within the cylinder, i.e. they act only as spacers, their exteriorly convex shaped discs abutting against the cylinder wall. Since furthermore the wall thickness of the discs of the mushroom formed elements are approximately on the same order as the piston-pin wall thickness, such mushrooms, were one to impress them into a piston pin longitudinal bore for purposes of sealing, would certainly during operation work loose as well.

In experiments with piston-pins of the initially mentioned type, discs of DIN 443 specifications and possessing a uniform wall thickness were first used as sealing elements. These cup shaped sealing elements were secured in the piston-pin longitudinal bore by means of a crease rolled in their rim; in actual operation, however, it turned out that this type of fastening was extremely problematical and that it by no means assured during actual operation that the sealing elements would not work free or form a no longer pressure tight seal in the piston-pin longitudinal bore. Therefore, a metal glue had to be added into the space between the receiving groove and the crease of the sealing element rim in the piston-pin longitudinal bore, and finally the cup shaped sealing elements had to be subjected to extensive heat treatment.

SUMMARY OF THE INVENTION

The object of the invention was therefore to develop these already experimentally conceived piston-pins of the type mentioned above so that they may inexpensively contain permanent seats for the sealing elements in the piston pin longitudinal bore; another object was to develop inexpensive seals for the piston-pins which would be capable of withstanding repeated piston-pin deformations and yet remain pressure tight. In the process of achieving a solution to the problem, the inventors discovered that the basic cause for the failures of past experiments resided in the small wall thickness of the cup shaped discs utilized as sealing elements, which were thereby incapable of absorbing or exerting the necessary forces to produce a permanent pressure tight impression or shrinkage seat. It was discovered that the sealing elements must be so rigid that they are capable of absorbing or exerting the necessary forces, while at the same time not working free within the piston-pin longitudinal bore as a result of the oval deformation of the piston-pin as well as the hydraulic pressure pulses acting upon the sealing elements during operation. The object of the invention was satisfied by designing the wall thickness of the base of the cup shaped sealing element to be approximately 60% of the sealing element rim wall thickness, and by limiting such latter sealing element rim thickness to approximately one-tenth to one-eighth of the wall thickness of the piston pin around the longitudinal bore; furthermore, the wall of the longitudinal bore was formed so as to contain a circumferential groove in the area of that end of a sealing element rim facing the base of the sealing element. By utilization of such sealing element rim, large specific pressures, as for instance exist in applications utilizing flat discs, are avoided; but the forces required for permanent sealing can nevertheless be produced as the wall thickness of the sealing element rim can be designed to be relatively large. And yet the sealing elements according to the invention can adjust to the oval deformations of the piston-pin arising during actual operation, as its base has a substantially smaller wall thickness and is therefore less rigid in the radial direction. Finally, in order to avoid all negative effects arising out of the radial rigidity produced by the base of the sealing elements, as well as out of the diameter variations appearing during actual operation as a result of hydraulic pulsation, the aforementioned groove is provided, allowing the section of the sealing elements adjoining the base to escape thereinto in response to the oval deformation of the piston-pin upon ignition. Such groove additionally contains a manufacturing advantage. During the hardening process the piston-pins will undergo some distortion so that the piston-pin longitudinal bore must thereafter be ground. The groove provides a desirable excess space for the grinding disc, so that a conic configuration of the inner end of the ground area of the piston-pin longitudinal bore can be avoided; such a conic configuration would cause the deformation of inner areas of sealing elements during the impressing of such elements, resulting in leakage under certan conditions. Furthermore, the interiorly located groove wall forms a stop when impressing the sealing element so that it assumes a definitive location.

While it is already known (OE-PS 186 461) to utilize cup shaped sealing elements in a crank pin of a crankshaft, such designs, however, did not suggest the features necessary to solve the problem which became the object of this invention. The longitudinal bore of a crank pin of this known type of crankshaft contains a pipe in which ends are attached cup shaped sealing elements. These elements, however, have everywhere the same wall thickness and are welded or soldered to the pipe. But the presence of a pipe is a requisite for such fastening of the sealing elements, as crankshafts as well as piston-pins are casehardened so that direct welding or soldering of the sealing elements to the crank-pin would partially destroy the desirable hardness. The experts therefore will recognize application of this type of technology only where pipes or casings can be inserted in the bores to be sealed, which is impossible for piston-pins as a result of the danger of transverse breaks. A variation of this known construction type has the sealing elements fastened by flanges; such type of fastening, however, is not applicable to sealing elements for piston-pin longitudinal bores, as is similarly the case for fastening by creases which was discussed above. Additionally, attachment by flanging or by means of creases is of course more expensive than the simple impressing or shrinking, the means of fastening the sealing elements according to this invention. Finally, reference to this type of technology as a solution of the object of the invention is inapplicable because a crankshaft pin is subject to entirely different demands than a piston-pin. Further characteristics of the preferred embodiment of the invention are presented in the attached claims 2 to 4.

DESCRIPTION OF THE DRAWINGS AND REPRESENTATIVE EMBODIMENT

Below is a description of the preferred embodiment of the invention with reference to the attached diagrams.

Figure 2:
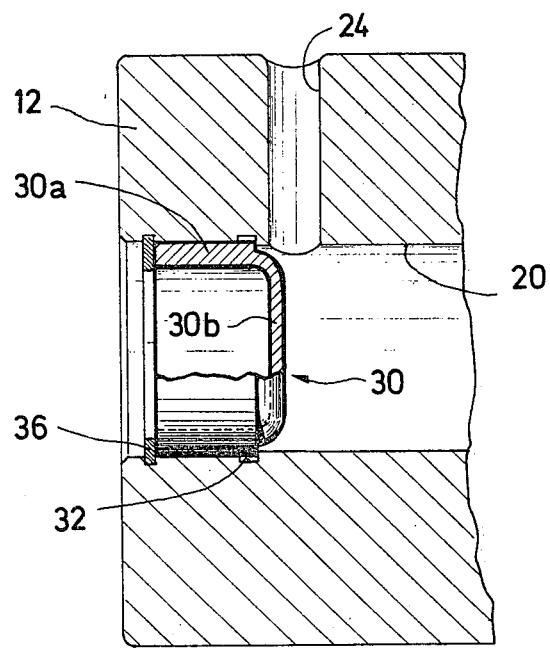

There is shown in FIG. 1 a vertical section through the center of a piston with a piston-pin according to the invention;

and in FIG. 2 a vertical section through an end of the piston-pin on a larger scale than FIG. 1.

FIG. 1 shows the upper end of a connecting rod 10 comprising a piston-pin 12 which is set in a cross bore 14 of a piston the entirety of which is indicated by 16, and which is secured within the cross bore by means of locking rings 18.

The piston-pin has a longitudinal bore 20, into which merge a central cross bore 22 as well as outer cross bore 24. The central cross bore 22 terminates in a groove 25 communicating with a longitudinal bore 26 within the connecting rod 10, while the exterior cross bores 24 terminate in grooves 27 and cooling oil bores 28 within the piston base 29 of piston 16. The cooling oil bores 28 continue in the piston base in a manner not shown, and finally end in the lower side of the piston from where the cooling oil then flows back toward the bottom into the crankshaft housing.

According to the invention the longitudinal bore 20 of the piston pin 12 is sealed by two cup shaped covers 30, which specifically consist of a material of high yield strength, and were produced by means of a deep drawing process.

As can be clearly seen in FIG. 2, each cover contains a rim 30a and a base 30b, the wall thicknesses of which are related in a proportion 1:0.6. In this manner, and additionally because of the favorable internal metal structure in the transition area between the rim and the base produced by the deep drawing process, the cover 30 adjusts particularly well to the oval deformations which the piston pin undergoes upon ignition in the upper dead center position of the piston.

In order to compensate for the radial rigidity caused by the base 30b in the base-rim transition area, the longitudinal bore 20 contains a circumferential groove 32 for each cover, into which the portion of rim 38 adjoining the base can escape upon oval deformation of the piston pin.

The cover 30 is secured within the longitudinal bore 20 by locking rings 36.

It was found to be particularly advantageous to impress the covers into the longitudinal bore 20 when said covers had an excess diameter of 2/100 to 6/100 of a millimeter and to grind the areas forming the compression seat.

It was furthermore discovered that the covers would contain adequate rigidity and yet be capable of relatively slight oval deformations, when the proportion of wall thickness of the piston pin 12 to the wall thickness of the rim 30a was between 10 and 8.

We claim:

1. A piston-pin for liquid cooled pistons comprising a longitudinal bore which at its ends is sealed by impressed or shrunk, cup shaped sealing elements consisting of a base and a rim, said base having a wall thickness of approximately 60% of said rim, and said rim having a wall thickness of approximately one-tenth to one-eighth of the wall thickness of aforesaid piston-pin surrounding the longitudinal bore; and a groove located in the wall of the longitudinal bore opposite the area of the rim facing the base of said cup shaped sealing elements.

2. A piston-pin according to claim 1, in which the diameter of the uninstalled sealing elements is such that its installation will not result in deformation beyond the yield limits of the material.

3. A piston-pin according to claim 2, in which the diameter of the uninstalled sealing elements is 0.02 to 0.06 mm larger than the diameter of the longitudinal bore.

4. A piston-pin according to claim 1, in which the rim of the sealing elements and the wall of the sealing elements possess surface properties of a ground surface.

5. A piston-pin according to claim 1, in which the sealing elements consist of a material of high yield limits, and have been produced by a deep drawing process.

6. Piston-pin for liquid cooled pistons, comprising a longitudinal bore which at its ends is sealed by cup shaped sealing elements, which are emplaced in a stressed condition, and consist of a base and a rim, the outer diameter of which rim while in the unstressed condition is slightly larger than the inner diameter of the longitudinal bore, while the wall thickness of the base is smaller than the rim wall thickness, and with the latter rim wall thickness being substantially less than the wall thickness of the piston-pin surrounding the longitudinal bore.

* * * * *